(12) United States Patent
Hebert et al.

(10) Patent No.: US 7,314,587 B2
(45) Date of Patent: *Jan. 1, 2008

(54) METHOD OF FORMING A MULTILAYER GOLF BALL WITH A THIN THERMOSET OUTER LAYER

(75) Inventors: Edmund A. Hebert, North Dartmouth, MA (US); William E Morgan, Barrington, RI (US); Dean Snell, Oceanside, CA (US)

(73) Assignee: Acushnet Company, Fairhaven, MA (US)

( * ) Notice: Subject to any disclaimer, the term of this patent is extended or adjusted under 35 U.S.C. 154(b) by 710 days.

This patent is subject to a terminal disclaimer.

(21) Appl. No.: 10/826,275

(22) Filed: Apr. 19, 2004

(65) Prior Publication Data

US 2004/0227269 A1    Nov. 18, 2004

Related U.S. Application Data

(60) Continuation of application No. 09/625,544, filed on Jul. 25, 2000, now Pat. No. 6,749,789, which is a continuation of application No. 09/207,690, filed on Dec. 9, 1998, now Pat. No. 6,132,324, which is a division of application No. 08/863,788, filed on May 27, 1997, now Pat. No. 5,885,172.

(51) Int. Cl.
  B29C 39/10     (2006.01)
  B29C 39/12     (2006.01)
(52) U.S. Cl. .................... 264/250; 264/255; 264/275; 264/279.1

(58) Field of Classification Search ............... None
See application file for complete search history.

(56) References Cited

U.S. PATENT DOCUMENTS

| 697,925 A | 4/1902 | Kempshall |
| 700,658 A | 5/1902 | Kempshall ............... 473/374 |
| 704,748 A | 7/1902 | Kempshall ............... 473/374 |

(Continued)

FOREIGN PATENT DOCUMENTS

AU    A-16547/97    2/1997

(Continued)

OTHER PUBLICATIONS

Raj B. Durairaj et al., "Cast Polyurethanes From Resorcinol-Based Aromatic Diols" (Oct. 10-14, 1998).

(Continued)

*Primary Examiner*—Edmund H. Lee
(74) *Attorney, Agent, or Firm*—Bingham McCutchen LLP

(57) ABSTRACT

The present invention is directed towards a method of forming a multilayer golf ball which comprises a core, an inner cover layer and an outer cover layer. The steps include forming a golf ball core; forming an inner cover layer around golf ball core with a material having a first shore D hardness; and casting an outer cover layer around inner cover layer and golf ball core with a thermoset material having a second shore D hardness less than the first. The inner cover layer is formed of a material having a shore D hardness that is about 5 to about 50 greater than the shore D hardness of the thermoset material forming the outer cover layer.

19 Claims, 4 Drawing Sheets

U.S. PATENT DOCUMENTS

| | | | |
|---|---|---|---|
| 720,852 A | 2/1903 | Smith | 473/374 |
| 1,558,706 A | 10/1925 | Mitzel | |
| 2,229,170 A | 1/1941 | Greene | 273/62 |
| 2,376,085 A | 5/1945 | Radford et al. | 18/30 |
| 3,147,324 A | 9/1964 | Ward | 264/254 |
| 3,177,280 A | 4/1965 | Ford et al. | 264/215 |
| 3,239,228 A | 3/1966 | Crompton, III | 273/218 |
| 3,262,272 A | 7/1966 | Barakauskas et al. | 60/39.05 |
| 3,572,721 A | 3/1971 | Harrison et al. | 273/218 |
| 3,572,722 A | 3/1971 | Harrison et al. | 273/218 |
| 3,616,101 A | 10/1971 | Satchell et al. | 161/7 |
| 3,666,272 A | 5/1972 | Walker et al. | 273/218 |
| 3,804,421 A | 4/1974 | Alex et al. | 273/218 |
| 3,808,077 A | 4/1974 | Reiser et al. | 156/102 |
| 3,926,933 A | 12/1975 | Naylor | 260/94.3 |
| 3,940,145 A | 2/1976 | Grentiluomo | 273/218 |
| 3,965,055 A | 6/1976 | Shichman et al. | 260/3 |
| 3,989,568 A | 11/1976 | Isaac | 156/182 |
| 3,992,014 A | 11/1976 | Retford | 273/218 |
| 4,033,900 A | 7/1977 | Hargis et al. | 252/431 L |
| 4,062,825 A | 12/1977 | Watabe et al. | 260/32 N |
| 4,123,061 A | 10/1978 | Dusbiber | 273/220 |
| 4,144,223 A | 3/1979 | Kent | 260/42.47 |
| 4,173,345 A | 11/1979 | Pocklington | 273/217 |
| 4,203,941 A | 5/1980 | Brooker | 273/217 |
| 4,229,401 A | 10/1980 | Pocklington | 264/248 |
| 4,267,217 A | 5/1981 | Brooker | 428/374 |
| 4,274,637 A | 6/1981 | Molitor | 273/235 R |
| 4,310,582 A | 1/1982 | Stumpe, Jr. | 428/182 |
| 4,367,873 A | 1/1983 | Chang et al. | 273/60 R |
| 4,429,068 A | 1/1984 | Nakahira | 524/302 |
| 4,431,193 A | 2/1984 | Nesbitt | 273/235 R |
| 4,473,229 A | 9/1984 | Kloppenburg et al. | 273/225 |
| 4,499,239 A | 2/1985 | Murakami et al. | 525/111 |
| 4,530,386 A | 7/1985 | Nakahira | 152/315 |
| 4,625,964 A | 12/1986 | Yamada | 273/62 |
| 4,650,193 A | 3/1987 | Molitor et al. | 273/228 |
| 4,674,751 A | 6/1987 | Molitor et al. | 273/235 |
| 4,692,497 A | 9/1987 | Gendreau et al. | 525/263 |
| 4,714,253 A | 12/1987 | Nakahara et al. | 473/378 |
| 4,848,770 A | 7/1989 | Shama | 273/228 |
| 4,852,884 A | 8/1989 | Sullivan | 273/230 |
| 4,858,924 A | 8/1989 | Saito et al. | 273/62 |
| 4,914,152 A | 4/1990 | Miyashita et al. | 525/68 |
| 4,919,434 A | 4/1990 | Saito | 273/235 R |
| 4,931,376 A | 6/1990 | Ikematsu et al. | 525/164 |
| 4,959,000 A | 9/1990 | Giza | 425/116 |
| 4,968,752 A | 11/1990 | Kawamoto et al. | 525/194 |
| 4,971,329 A | 11/1990 | Llort et al. | 273/218 |
| 4,984,803 A | 1/1991 | Llort et al. | 273/235 R |
| 5,002,281 A | 3/1991 | Nakahara et al. | 273/220 |
| 5,006,288 A | 4/1991 | Rhodes et al. | 264/46.6 |
| 5,006,297 A | 4/1991 | Brown et al. | 263/234 |
| 5,017,636 A | 5/1991 | Hattori et al. | 524/300 |
| 5,025,059 A | 6/1991 | Mouri et al. | 524/495 |
| 5,037,104 A | 8/1991 | Watanabe et al. | 273/35 |
| 5,072,944 A | 12/1991 | Nakahara et al. | 273/220 |
| 5,112,556 A | 5/1992 | Miller | 264/279 |
| 5,131,662 A | 7/1992 | Pollitt | 273/230 |
| 5,141,233 A | 8/1992 | Yuki et al. | 273/218 |
| 5,150,905 A | 9/1992 | Yuki et al. | 273/218 |
| 5,184,828 A | 2/1993 | Kim et al. | 273/228 |
| 5,252,652 A | 10/1993 | Egahira et al. | 524/392 |
| 5,253,871 A | 10/1993 | Viollaz | 273/228 |
| 5,314,187 A | 5/1994 | Proudfit | 273/235 R |
| 5,334,673 A | 8/1994 | Wu | 273/235 R |
| 5,415,937 A | 5/1995 | Cadorniga et al. | 473/385 X |
| 5,421,580 A | 6/1995 | Sugimoto et al. | 273/227 |
| 5,461,109 A | 10/1995 | Blair et al. | 524/839 |
| 5,482,287 A | 1/1996 | Nesbitt | 273/232 |
| 5,484,870 A | 1/1996 | Wu | 528/28 |
| 5,494,958 A | 2/1996 | Freeman et al. | 524/505 |
| 5,496,496 A | 3/1996 | Kajita et al. | 252/182.24 |
| 5,543,467 A | 8/1996 | Hamada et al. | 525/207 |
| 5,553,852 A | 9/1996 | Higuchi et al. | 473/373 |
| 5,565,524 A | 10/1996 | Hamada et al. | 525/208 |
| 5,574,107 A | 11/1996 | Hiraoka et al. | 473/378 |
| 5,575,472 A | 11/1996 | Magerman et al. | 29/530 |
| 5,585,440 A | 12/1996 | Yamada et al. | 525/193 |
| 5,586,950 A | 12/1996 | Endo | 473/378 |
| 5,587,420 A | 12/1996 | Takizawa et al. | 524/572 |
| 5,589,546 A | 12/1996 | Hiraoka et al. | 525/193 |
| 5,609,535 A | 3/1997 | Morgan | 473/378 X |
| 5,625,003 A | 4/1997 | Kato et al. | 525/208 |
| 5,628,699 A | 5/1997 | Maruko et al. | 473/363 |
| 5,663,235 A | 9/1997 | Tanaka | 525/201 |
| 5,688,191 A | 11/1997 | Cavallaro et al. | 473/373 |
| 5,692,973 A | 12/1997 | Dalton | 473/374 |
| 5,692,974 A | 12/1997 | Wu et al. | 473/377 |
| 5,697,856 A | 12/1997 | Moriyama et al. | 473/374 |
| 5,704,852 A | 1/1998 | Kato et al. | 473/357 |
| 5,713,801 A | 2/1998 | Aoyama | 473/354 |
| 5,713,802 A | 2/1998 | Moriyama et al. | 473/374 |
| 5,716,293 A | 2/1998 | Yabuki et al. | 473/363 |
| 5,728,011 A | 3/1998 | Sugimoto et al. | 473/357 |
| 5,730,663 A | 3/1998 | Tanaka et al. | 473/373 |
| 5,730,664 A | 3/1998 | Asakura et al. | 473/373 |
| 5,730,665 A | 3/1998 | Shimosaka et al. | 473/376 |
| 5,733,428 A | 3/1998 | Calabria et al. | 264/134 |
| 5,744,549 A | 4/1998 | Lutz | 525/129 |
| 5,749,796 A | 5/1998 | Shimosaka et al. | 473/365 |
| 5,759,676 A | 6/1998 | Cavallaro | 428/215 |
| 5,762,568 A | 6/1998 | Kato | 473/365 |
| 5,766,096 A | 6/1998 | Maruko et al. | 473/365 |
| 5,772,530 A | 6/1998 | Kato | 473/363 |
| 5,776,013 A | 7/1998 | Yokota | 473/377 |
| 5,779,561 A | 7/1998 | Sullivan | 473/373 |
| 5,779,562 A | 7/1998 | Melvin | 473/373 |
| 5,792,008 A | 8/1998 | Kakiuchi et al. | 473/354 |
| 5,797,808 A | 8/1998 | Hayashi et al. | 473/364 |
| 5,800,286 A | 9/1998 | Kakiuchi et al. | 473/365 |
| 5,803,831 A | 9/1998 | Sullivan et al. | 473/374 |
| 5,810,678 A | 9/1998 | Cavallaro | 473/373 |
| 5,813,923 A | 9/1998 | Cavallaro | 473/373 |
| 5,816,939 A | 10/1998 | Hamada et al. | 473/357 |
| 5,816,944 A | 10/1998 | Asakura et al. | 473/372 |
| 5,820,485 A | 10/1998 | Hwang | 473/361 |
| 5,820,486 A | 10/1998 | Tanaka et al. | 473/374 |
| 5,820,488 A | 10/1998 | Sullivan et al. | 473/374 |
| 5,827,134 A | 10/1998 | Sullivan et al. | 473/372 |
| 5,833,553 A | 11/1998 | Sullivan et al. | 473/374 |
| 5,836,833 A | 11/1998 | Shimosaka et al. | 473/365 |
| 5,836,834 A | 11/1998 | Masutani et al. | 473/374 |
| 5,840,801 A | 11/1998 | Gardiner | 525/54.44 |
| 5,856,388 A | 1/1999 | Harris et al. | 524/320 |
| 5,859,153 A | 1/1999 | Kirk et al. | 525/481 |
| 5,861,465 A | 1/1999 | Hamada et al. | 525/332.6 |
| 5,885,172 A | 3/1999 | Hebert et al. | 473/354 |
| 5,885,173 A | 3/1999 | Keller | 473/385 |
| 5,888,437 A | 3/1999 | Calabria et al. | 264/135 |
| 5,899,822 A | 5/1999 | Yamagishi et al. | 473/374 |
| 5,902,855 A | 5/1999 | Sullivan | 525/221 |
| 5,908,358 A | 6/1999 | Wu | 473/378 |
| 5,919,100 A | 7/1999 | Boechm et al. | 473/354 |
| 5,919,101 A | 7/1999 | Yokata et al. | 473/374 |
| 5,929,171 A | 7/1999 | Sano et al. | 525/261 |
| 5,948,862 A | 9/1999 | Sano et al. | 525/89 |
| 5,959,059 A | 9/1999 | Vedula et al. | 528/76 |
| 5,971,870 A | 10/1999 | Sullivan et al. | 473/373 |
| 5,976,035 A | 11/1999 | Umezawa et al. | 473/364 |
| 5,981,684 A | 11/1999 | Bruchmann et al. | 528/45 |
| 5,984,807 A | 11/1999 | Wai et al. | 473/376 |
| 5,989,136 A | 11/1999 | Renard et al. | 473/376 |
| 5,994,470 A | 11/1999 | Tanaka | 525/183 |

| | | | |
|---|---|---|---|
| 6,001,930 A | 12/1999 | Rajagopalan | 525/92 |
| 6,004,226 A | 12/1999 | Asakura | 473/373 |
| 6,012,997 A | 1/2000 | Mason | 473/594 |
| 6,015,356 A | 1/2000 | Sullivan et al. | 473/373 |
| 6,057,403 A | 5/2000 | Sullivan et al. | 525/221 |
| 6,103,166 A | 8/2000 | Boehm et al. | 264/250 |
| 6,117,024 A | 9/2000 | Dewanjee | 473/351 |
| 6,117,025 A | 9/2000 | Sullivan | 473/373 |
| 6,126,559 A | 10/2000 | Sullivan | 473/378 |
| 6,130,295 A | 10/2000 | Yokota | 525/221 |
| 6,132,324 A | 10/2000 | Hebert et al. | 473/378 |
| 6,149,535 A | 11/2000 | Bissonnette et al. | 473/354 |
| 6,152,834 A | 11/2000 | Sullivan | 473/365 |
| 6,190,268 B1 | 2/2001 | Dewanjee | 473/370 |
| 6,193,619 B1 | 2/2001 | Wu et al. | 473/374 |
| 6,290,611 B1 | 9/2001 | Rajagopalan et al. | 473/371 |
| 6,309,313 B1 | 10/2001 | Peter | 473/378 |
| 6,315,684 B1 | 11/2001 | Binette et al. | 473/377 |
| 6,368,237 B1 | 4/2002 | Sullivan | 473/378 |
| 6,503,156 B1 | 1/2003 | Sullivan | 473/374 |
| 2002/0039935 A1 | 4/2002 | Dewanjee | |

FOREIGN PATENT DOCUMENTS

| | | |
|---|---|---|
| AU | A-16548/97 | 2/1997 |
| AU | 703884 | 3/1997 |
| EP | 0577 058 A1 | 1/1994 |
| EP | 0 903 357 A1 | 3/1999 |
| GB | 1 168 609 | 10/1969 |
| GB | 1 209 032 | 10/1970 |
| GB | 2278609 | 7/1994 |
| GB | 2291811 | 7/1996 |
| GB | 2291812 | 7/1996 |
| GB | 2291817 | 7/1996 |
| GB | 2 321 021 A | 3/1997 |
| WO | WO 98/37929 | 9/1998 |
| WO | WO 00/57962 | 10/2000 |

OTHER PUBLICATIONS

Raj B. Durairaj, "HER Materials For Polyurethane Applications" (Spring, 1999).

Chapter 8 of Polyurethane Handbook, Solid Polyurethane Materials, (date of publication unknown), pp. 388-421 and 433-438; (Section 8.1, PUR Cast Systems, A. Atwater et al., pp. 388-421) (Section 8.3, Special Elastomers, K. Recker, pp. 433-438).

METHOD OF FORMING A MULTILAYER GOLF BALL WITH A THIN THERMOSET OUTER LAYER

CROSS-REFERENCE TO RELATED APPLICATION

This application is a continuation of U.S. patent application Ser. No. 09/625,544, filed Jul. 25, 2000, now U.S. Pat. No. 6,749,789, which is a continuation of U.S. patent application Ser. No. 09/207,690, filed Dec. 9, 1998, now U.S. Pat. No. 6,132,324, which is a division of U.S. patent application Ser. No. 08/863,788, filed May 27, 1997, now U.S. Pat. No. 5,885,172. The entire disclosures of these applications are incorporated by reference herein.

FIELD OF INVENTION

This invention relates generally to golf balls, and more specifically, to a multilayer golf ball. In particular, this invention relates to a golf ball having a core, an inner cover layer and a very thin outer cover layer, wherein the outer cover layer comprises a thermoset material formed from a castable, reactive liquid and the inner cover layer comprises a high flexural modulus material. The multilayer golf balls of the present invention provide "progressive performance" characteristics when struck with golf clubs of varying head speed and loft angle.

BACKGROUND OF THE INVENTION

Until recently golf balls were typically divided into two general types or groups: 1) two piece balls and 2) wound balls (also know as three piece balls). The difference in play characteristics resulting from these different types of constructions can be quite significant.

Balls having a two piece construction are generally most popular with the recreational golfer because they provide a very durable ball while also providing maximum distance. Two piece balls are made with a single solid core, usually formed of a crosslinked rubber, which is encased by a cover material. Typically the solid core is made of polybutadiene which is chemically crosslinked with zinc diacrylate and/or similar crosslinking agents. The cover comprises tough, cut-proof blends of one or more materials known as ionomers such as SURLYNs®, which are resins sold commercially by DuPont or Iotek® which is sold commercially by Exxon.

The combination of the above-described core and cover materials provides a "hard" covered ball that is resistant to cutting and other damage caused by striking the ball with a golf club. Further, such a combination imparts a high initial velocity to the ball which results in increased distance. Due to their hardness however, these balls have a relatively low spin rate which makes them difficult to control, particularly on shorter approach shots. As such, these types of balls are generally considered to be "distance" balls. Because these materials are very rigid, many two piece balls have a hard "feel" when struck with a club. Softer cover materials such as balata and softer ionomers in some instances, have been employed in two piece construction balls in order to provide improved "feel" and increased spin rates.

Wound balls typically have either a solid rubber or liquid filled center around which many yards of a stretched elastic thread or yarn are wound to form a core. The wound core is then covered with a durable cover material such as a SURLYN® or similar material or a softer cover such as balata. Wound balls are generally softer than two piece balls and provide more spin, which enables a skilled golfer to have more control over the ball's flight. In particular, it is desirable that a golfer be able to impart back spin to a golf ball for purposes of controlling its flight and controlling the action of the ball upon landing on the ground. For example, substantial back spin will make the ball stop once it strikes the landing surface instead of bounding forward. The ability to impart back spin onto a golf ball is related to the extent to which the golf ball cover deforms when it is struck with a golf club. Because wound balls are traditionally more deformable than conventional two piece balls, it is easier to impart spin to wound balls. However, wound higher spinning balls typically travel a shorter distance when struck as compared to a two piece ball. Moreover, as a result of their more complex structure, wound balls generally require a longer time to manufacture and are more expensive to produce than a two piece ball.

The United States Golf Association (USGA) has instituted a rule that prohibits the competitive use in any USGA sanctioned event of a golf ball that can achieve an initial velocity of greater than 76.2 meters per second (m/s), or 250 ft/s, when struck by a driver with a velocity of 39.6 m/s, i.e., 130 ft/s (referred to hereinafter as "the USGA test"). However, an allowed tolerance of two percent permits manufacturers to produce golf balls that achieve an initial velocity of 77.7 m/s (255 ft/s).

Regardless of the form of the ball, players generally seek a golf ball that delivers maximum distance, which requires a high initial velocity upon impact. Therefore, in an effort to meet the demands of the marketplace, manufacturers strive to produce golf balls with initial velocities in the USGA test that approximate the USGA maximum of 77.7 m/s or 255 ft/s as closely as possible.

Therefore, golf ball manufacturers are continually searching for new ways in which to provide golf balls that deliver the maximum performance in terms of both distance and spin rate for golfers of all skill levels.

Relatively recently, a number of golf ball manufacturers have introduced multilayer golf balls, i.e., having multiple core intermediate mantle and/or cover layers, in an effort to overcome some of the undesirable aspects of conventional two piece balls, such as their hard feel, while maintaining the positive attributes of these golf balls (including their increased initial velocity and distance). Examples of multilayer balls include the Altus Newing (Bridgestone), Reygrande 2×2, Giga (Spalding) Metal Mix (Dunlop), Ultra Tour Balata (Wilson).

Additionally, a number of patents have been issued directed towards modifying the properties of a conventional two piece ball by altering the typical single layer core and/or single cover layer construction to provide a multilayer core and/or cover. The inventions disclosed in these patents are directed towards improving a variety of golf ball characteristics.

For example, there are a number of multilayer ball patents directed towards improving the spin, click or feel of solid balls while maintaining the distance provided by the solid construction. A variety of approaches to manipulating the core construction are described in the art. For example, U.S. Pat. No. 5,072,944 discloses a three-piece solid golf ball having a center and outer layer which are prepared from a rubber composition, preferably having a base rubber of polybutadiene. This patent teaches that it is desirable that the center core is softer than the outer layer, wherein the layers have a hardness (Shore C) of 25-50 and 70-90 respectively.

U.S. Pat. No. 4,625,964 relates to a solid golf ball having a polybutadiene rubber core of a diameter not more than 32 mm, and a polybutadiene rubber intermediate layer having a specific gravity lower than that of the core material.

U.S. Pat. No. 4,848,770 discloses a non-wound three-piece golf ball which includes a core of a highly filled synthetic rubber or polymeric material, an intermediate mantle of an unfilled synthetic rubber and a cover. The core and intermediate mantle have a hardness between 50-95.

U.S. Pat. No. 5,002,281 is directed towards a three-piece solid golf ball which has an inner core having a hardness of 25-70 (Shore C) and an outer shell having a hardness of 80-95 (Shore C), wherein the specific gravity of the inner core must be greater than 1.0, but less than or equal to that of the outer shell, which must be less than 1.3.

U.S. Pat. No. 5,253,871 concerns a golf ball having a three piece structure comprising an elastomer core, an intermediate layer of a thermoplastic material containing at least 10% of ether block copolymer, preferably blended with an ionomer and a thermoplastic cover.

Several additional patents are directed to golf balls having multiple cover layers. For example U.S. Pat. No. 4,431,193 relates to a golf ball having a multilayer cover wherein the inner layer is a hard, high flexural modulus ionomer resin and the outer layer is a soft, low flexural modulus ionomer resin, wherein either or both layers may comprise a foamed ionomer resin.

U.S. Pat. No. 5,314,187 also relates to golf balls having a cover formed with multiple layers, wherein the outer layer is molded over the inner layer and comprises a blend of balata and an elastomer and the inner layer is an ionomer resin.

U.S. Pat. No. 4,919,434 is directed towards a golf ball having a cover which comprises an inner layer and an outer layer each of which comprise a thermoplastic resin, preferably the layers comprise of materials that are capable of fusion bonding with each other.

UK Patent Application Nos. GB 2,291,817 and 2,291,812 are both directed towards a wound golf ball with improved distance comprising a dual cover layer, wherein the inner cover layer has a high hardness as compared to the outer cover layer. These references teach that the cover layers may be formed from balata or ionomer resins and should have a combined thickness of less than 4 mm.

UK Patent Application No. GB 2,278,609 discloses a multilayer golf ball providing enhanced distance without sacrificing playability or durability comprising a core, an inner cover layer and an outer cover layer wherein the inner cover layer comprises a high acid ionomer and the outer cover layer comprises a soft ionomer or a non-ionomeric thermoplastic elastomer.

However, none of these patents disclose a multilayer ball having a very thin thermoset outer layer formed from a castable reactive liquid as disclosed herein to provide golf balls exhibiting a "progressive performance" such as those golf balls of the present invention.

SUMMARY OF THE INVENTION

The present invention is directed towards a multilayer golf ball which provides "progressive performance" characteristics when struck with golf clubs of varying head speeds and loft angles.

The present invention is further directed towards a multilayer golf ball which in general comprises a core, an inner cover layer and a very thin (i.e., <0.05") outer cover layer, wherein the inner cover layer comprises a high flexural modulus material and the outer cover layer comprises a thermoset material which is formed from a castable reactive liquid material.

In one particular embodiment, the present invention is directed towards a multilayer golf ball which comprises a core, an inner cover layer and a very thin outer cover layer, wherein: a) the core comprises a solid or liquid filled center around which a length of elastic thread is wound; b) the inner cover layer comprises a high flexural modulus material; and c) the outer cover layer comprises a thermoset material which is formed from a castable reactive liquid.

DETAILED DESCRIPTION OF THE INVENTION

Figure 1:
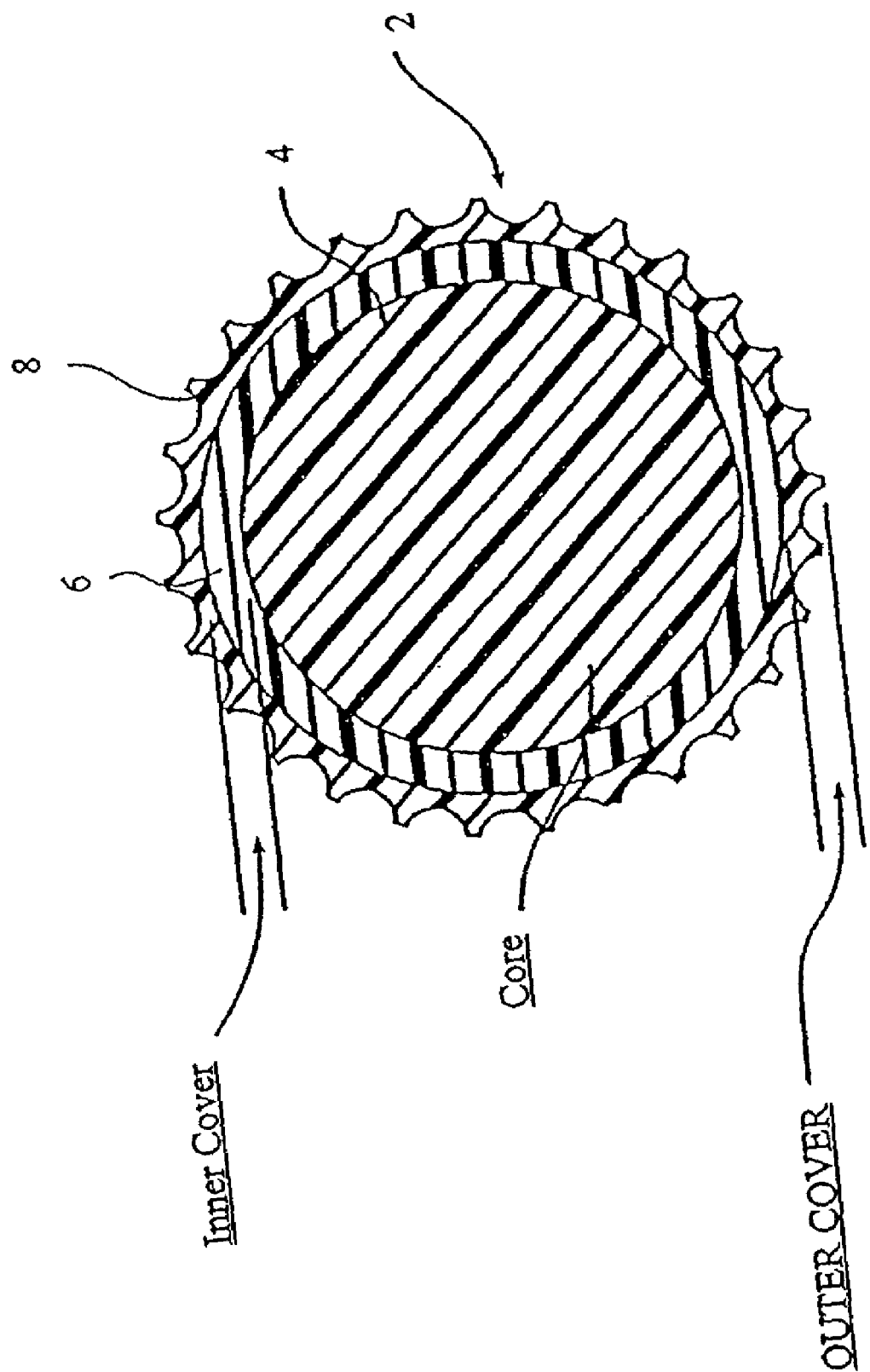
FIG. 1 is a cross-section of a golf ball 2 having a core 4, an inner cover layer 6 and an outer cover layer 8.
Figure 2:
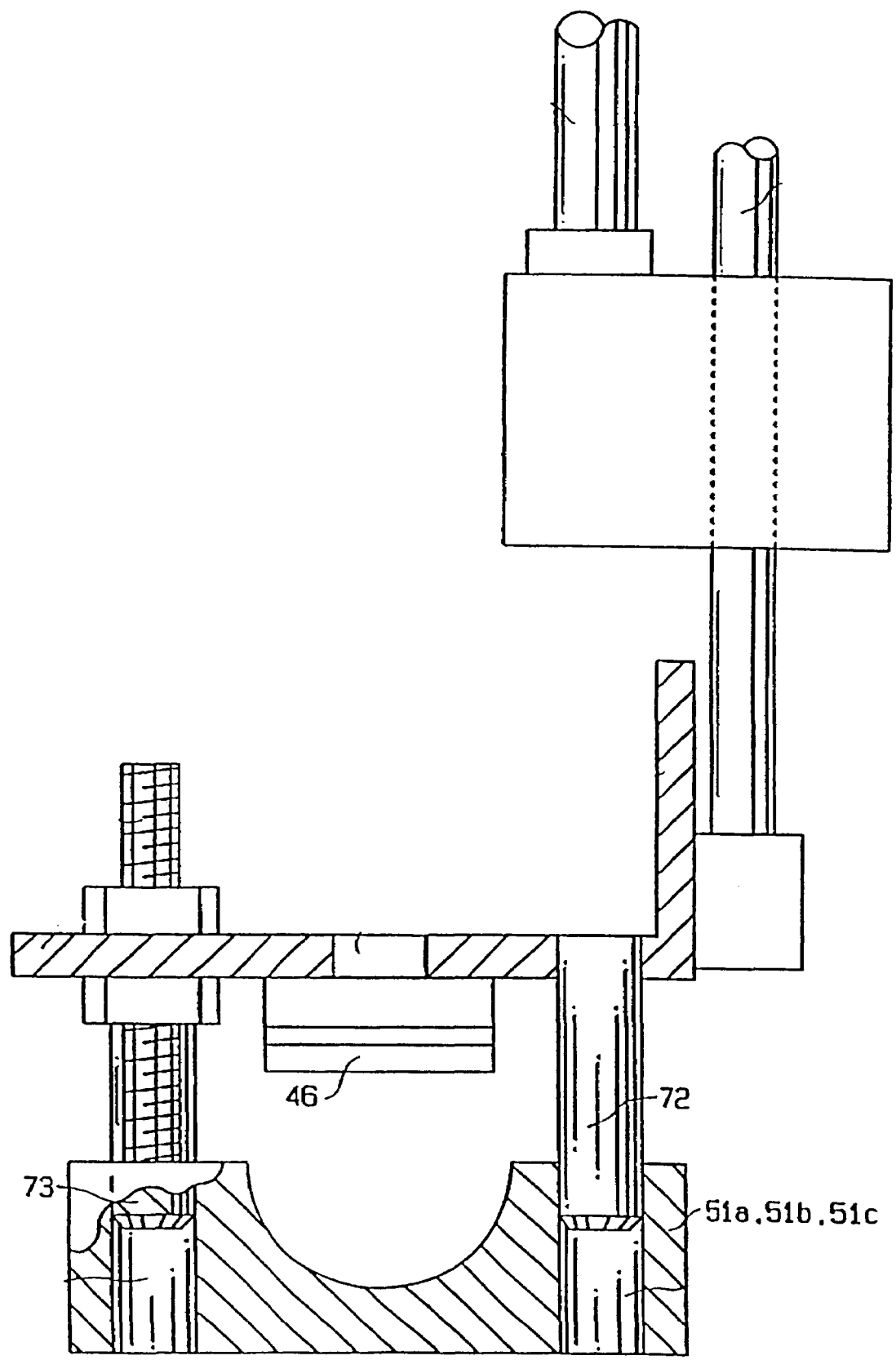
FIG. 2 is a partial side elevational view of a cover casting device.

By the present invention, it has been discovered that a golf ball of the presently claimed construction has a "progressive performance" when struck with a variety of clubs. More specifically, as used herein, the term "progressive performance" means that the presently claimed golf ball has the distance benefits of a traditional hard covered two piece ball when struck with a club having a high club head speed and a low loft angle, but also the high spin and feel characteristics similar to that of a traditional soft covered wound ball when struck with a club having a low head speed and high loft angle. Thus, golf balls of the presently claimed construction provide the "best of both worlds" in the golf ball art, i.e., a maximum distance ball for long shots (e.g., with a driver) which has high spin and controllability for short shots (e.g., with a wedge).

Without being limited to any particular theory, it is believed that with low club head speed and high loft shots such as those made with an 8-iron or a wedge, a ball's surface hardness has a greater influence on the ball's flight characteristics than the ball's overall construction. Thus, all other parameters being equal, a ball with a softer surface will have a higher spin rate than one with a harder surface, regardless of the ball's overall construction. Conversely, however, when a golf ball is struck with a high club head speed and a low loft angle, such as that of a driver, it appears that the opposite is true and that the overall construction of the ball has a greater influence on the ball's flight characteristics than does the surface hardness.

Accordingly, by the present invention, it has been found that by creating a golf ball with a low spin construction, but adding a very thin layer of a relatively soft thermoset material formed from a castable reactive liquid, a golf ball with "progressive performance" from driver to wedge can be formed. As used herein, the term "thermoset" material refers to an irreversible, solid polymer that is the product of the reaction of two or more prepolymer precursor materials.

The invention is particularly directed towards a multilayer golf ball which comprises a core, an inner cover layer and an outer cover layer. The thickness of the outer cover layer is critical to the "progressive performance" of the golf balls of the present invention. If the outer cover layer is too thick, this cover layer will contribute to the in-flight characteristics related to the overall construction of the ball and not the cover surface properties. However, if the outer cover layer is too thin, it will not be durable enough to withstand repeated impacts by the golfer's clubs. Specifically, it has been determined that the outer cover layer must have a thickness of less than about 0.05 inches, preferably between about 0.02 and about 0.04 inches. Most preferably, this thickness is about 0.03 inches.

The outer cover layer is formed from a relatively soft thermoset material in order to replicate the soft feel and high spin play characteristics of a balata ball when the balls of the present invention are used for pitch and other "short game" shots. In particular, the outer cover layer should have a Shore D hardness of from about 30 to about 60, preferably 35-50 and most preferably 40-45. Additionally, the materials of the outer cover layer must have a degree of abrasion resistance in order to be suitable for use as a golf ball cover.

The outer cover layer of the present invention can comprise any suitable thermoset material which is formed from a castable reactive liquid material. The preferred materials for the outer cover layer include, but are not limited to, thermoset urethanes and polyurethanes, thermoset urethane ionomers and thermoset urethane epoxies. Examples of suitable polyurethane ionomers are disclosed in co-pending U.S. patent application Ser. No. 08/482,519, filed Jun. 7, 1995, entitled "Golf Ball Covers", the disclosure of which is hereby incorporated by reference in its entirety in the present application.

Thermoset polyurethanes and urethanes are particularly preferred for the outer cover layers of the balls of the present invention. Polyurethane is a product of a reaction between a polyurethane prepolymer and a curing agent. The polyurethane prepolymer is a product formed by a reaction between a polyol and a diisocyanate. The curing agent is typically either a diamine or glycol. Often a catalyst is employed to promote the reaction between the curing agent and the polyurethane prepolymer.

Conventionally, thermoset polyurethanes are prepared using a diisocyanate, such as 2,4-toluene diisocyanate (TDI) or methylenebis-(4-cyclohexyl isocyanate) (HMDI) and a polyol which is cured with a polyamine, such as methylenedianiline (MDA), or a trifunctional glycol, such as trimethylol propane, or tetrafunctional glycol, such as N,N,N', N'-tetrakis(2-hydroxypropyl)ethylenediamine. However, the present invention is not limited to just these specific types of thermoset polyurethanes. Quite to the contrary, any suitable thermoset polyurethane may be employed to form the outer cover layer of the present invention.

The inner cover layer of the present invention is formed from a hard, high flexural modulus, resilient material which contributes to the low spin, distance characteristics of the presently claimed balls when they are struck for long shots (e.g. driver or long irons). Specifically, the inner cover layer materials have a Shore D hardness of about 65-80, preferably about 69-74 and most preferably about 70-72. Furthermore, as defined herein, the term "high flexural modulus" means a flexural modulus (as measured by ASTM 790) of at least about 65,000 psi, preferably about 70,000 psi to about 120,000 psi and most preferably at least about 75,000 psi. The thickness of the inner cover layer can range from about 0.020 inches to about 0.045 inches, preferably about 0.030 inches to about 0.040 inches and most preferably about 0.035 inches.

The inner cover layer may be formed from a wide variety of hard, high flexural modulus resilient materials. Among the preferred inner cover materials are hard, high flexural modulus ionomer resins and blends thereof. These ionomers are obtained by providing a cross metallic bond to polymers of monoolefin with at least one member selected from the group consisting of unsaturated mono- or di-carboxylic acids having 3 to 12 carbon atoms and esters thereof (the polymer contains 1 to 50% by weight of the unsaturated mono- or di-carboxylic acid and/or ester thereof). More particularly, such acid-containing ethylene copolymer ionomer component includes E/X/Y copolymers where E is ethylene, X is a softening comonomer such as acrylate or methacrylate present in 0-50 (preferably 0-25, most preferably 0-20), weight percent of the polymer, and Y is acrylic or methacrylic acid present in 5-35 (preferably at least about 16, more preferably at least about 16-35, most preferably at least about 16-20) weight percent of the polymer, wherein the acid moiety is neutralized 1-90% (preferably at least 40%, most preferably at least about 60%) to form an ionomer by a cation such as lithium*, sodium*, potassium, magnesium*, calcium, barium, lead, tin, zinc* or aluminum (*=preferred), or a combination of such cations. Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers.

The manner in which the ionomers are made is well known in the art as described in e.g, U.S. Pat. No. 3,262,272. Such ionomer resins are commercially available from DuPont Co. under the tradename SURLYN® and from Exxon under the tradename Iotek®. Some particularly suitable SURLYNS® include SURLYN® 8140 (Na) and SURLYN® 8546 (Li) which have an methacrylic acid content of about 19%.

However, the materials for the inner cover layer are not limited to ionomer resins. Instead, the present invention contemplates that virtually any hard, high flexural modulus, resilient material which is compatible with the other materials of the golf ball may be employed as the inner cover layer. Examples of other suitable inner cover materials include thermoplastic or thermoset polyurethanes, thermoplastic or thermoset polyetheresters or polyetheramides, thermoplastic or thermoset polyester, a dynamically vulcanized elastomer, a functionalized styrene-butadiene elastomer, a metallocene polymer or blends thereof.

Suitable thermoplastic polyetheresters include materials which are commercially available from DuPont under the tradename Hytrel®. Suitable thermoplastic polyetheramides include materials which are available from Elf-Atochem under the tradename Pebax®. Other suitable materials for the inner cover layer include nylon and acrylonitrile-butadiene-styrene copolymer (ABS).

The golf ball cores of the present invention may comprise any of a variety of constructions. For example, the core of the golf ball may comprise a conventional center surrounded by an intermediate mantle layer disposed between the center and the inner cover layer. The core may be a single layer or may comprise a plurality of layers. The innermost portion of the core may be solid or it may be a liquid filled sphere. As with the core, the intermediate mantle layer may also comprises a plurality of layers. The core may also comprise a solid or liquid filled center around which many yards of a stretched elastic thread or yarn are wound.

The materials for solid cores include compositions having a base rubber, a crosslinking agent, a filler, and a co-crosslinking or initiator agent. The base rubber typically includes natural or synthetic rubbers. A preferred base rubber is 1,4-polybutadiene having a cis-structure of at least 40%. If desired, the polybutadiene can also be mixed with other elastomers known in the art such as natural rubber, polyisoprene rubber and/or styrene-butadiene rubber in order to modify the properties of the core.

The crosslinking agent includes a metal salt of an unsaturated fatty acid such as a zinc salt or a magnesium salt of an unsaturated fatty acid having 3 to 8 carbon atoms such as acrylic or methacrylic acid. Suitable cross linking agents include metal salt diacrylates, dimethacrylates and monomethacrylates wherein the metal is magnesium, calcium, zinc, aluminum, sodium, lithium or nickel.

The initiator agent can be any known polymerization initiator which decomposes during the cure cycle. Suitable initiators include peroxide compounds such as dicumyl peroxide, 1,1-di(t-butylperoxy) 3,3,5-trimethyl cyclohexane, a-a bis (t-butylperoxy) diisopropylbenzene, 2,5-dimethyl-2,5 di(t-butylperoxy) hexane or di-t-butyl peroxide and mixtures thereof.

Conventional prior art golf balls typically incorporate 5 to 50 pph of zinc oxide in a diacrylate-peroxide core system. However, the zinc oxide may be replaced by calcium oxide in a diacrylate-peroxide system to provide a suitable core composition.

As used herein, the term "filler" includes any compound or composition that can be used to vary the density and other properties of the core. Fillers typically includes materials such as zinc oxide, barium sulfate, silica, calcium carbonate, zinc carbonate reground (recycled core material ground to 30 mesh particle) and the like.

In one embodiment of the present invention, the core comprises a center which is liquid-filled or solid around which an elastic thread is wound. The solid center is typically a homogenous mass of a resilient material such as polybutadiene or a natural rubber. The liquid-filled center is typically a thin walled sphere made from a thermoplastic or thermoset material into which a liquid such as corn syrup is injected by means of a needle. The sphere is then sealed and typically frozen to make the core a solid mass. The windings for either type of center are provided by an elastic thread which is stretched and wound about the core to a desired thickness.

The overall outer diameter (OD) of the core (including the center and any intermediate mantle layer(s) or windings) together with the inner cover layer of the golf balls of the present invention is about 1.580 inches to about 1.640 inches, preferably about 1.60 inches to about 1.630 inches, and most preferably about 1.620 inches.

The present multilayer golf ball can have an overall diameter of any size. Although the United States Golf Association (USGA) specifications limit the minimum size of a competition golf ball to more than 1.680 inches in diameter, there is no specification as to the maximum diameter. Moreover, golf balls of any size can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches.

The cores and inner cover of the golf balls of the present invention can be made by any conventional process employed in the golf ball art. For example, the solid centers can be either injection or compression molded. Similarly, the wound centers employed in the present invention can be produced through conventional means. The inner cover layer and any mantle layer(s) are subsequently injection or compression molded about the core.

However, due to the very thin nature (less than 0.05"), it is not practical to form the outer cover layers of the ball of the present invention using conventional injection or compression molding techniques ordinarily employed in the golf ball art for applying cover materials. These conventional ball molding processes are not capable of easily applying such thin outer cover layers over a solid spherical surface.

Accordingly, it has been found by the present invention that the use of a castable, reactive material which is applied in a fluid form makes it possible to obtain very thin outer cover layers on golf balls. Specifically, it has been found that castable, reactive liquids which react to form a thermoset material provide desirable very thin outer cover layers.

The castable, reactive liquid employed to form the thermoset material can be applied over the inner core using a variety of application techniques such as spraying, dipping, spin coating or flow coating methods which are well known in the art. An example of a suitable coating technique is that which is disclosed in U.S. Pat. No. 5,733,428, filed May 2, 1995 entitled "Method And Apparatus For Forming Polyurethane Cover On A Golf Ball", the disclosure of which is hereby incorporated by reference in its entirety in the present application.

Figure 4:
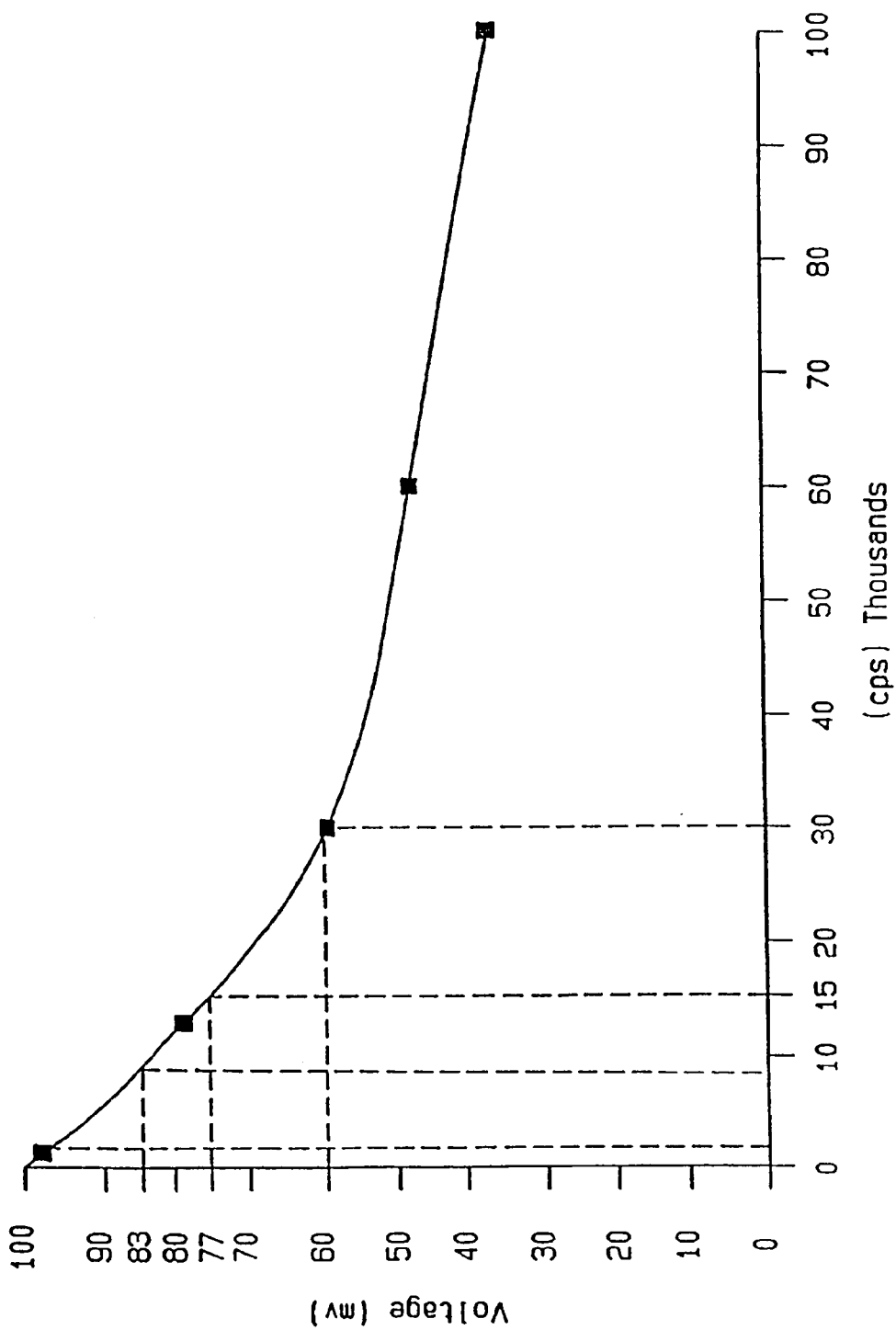
FIG. 4 is a graph plotting voltage vs. cps for suitable viscosities of curing urethane.

The cover 8 is formed around the coated core 14 by mixing and introducing the material in mold halves 51*a, b, c* and 59*a, b, c*. Once mixed, an exothermic reaction commences and continues. It is important that the viscosity be measured over time, so that the subsequent steps of filling each mold half, introducing the core into one half and closing the mold can be properly timed for accomplishing centering of the core cover halves fusion and achieving overall uniformity. Suitable viscosity range of the curing urethane mix for introducing cores into the mold halves is determined to be approximately between 2,000 cps-30,000 cps or between 60 mv-98 mv voltage output with the preferred range of 8,000 to 15,000 cps (see FIG. 4). The time (gel time) at which the desired viscosity range occurs for mold mating is measured from first introduction of mix into the top half mold 51*a, b, c*.

The cover material used in the present method is polyurethane which is the product of a reaction between a polyurethane prepolymer and a curing agent. To start the cover formation, mixing of the prepolymer and curative is accomplished in motorized mixer including mixing head 61 by feeding through lines 63 and 64 metered amounts of curative and prepolymer. Top preheated mold halves 51*a, b, c* are filled and placed in fixture unit using pins 72 and 73 moving into holes in each mold. After the reacting materials have resided in top mold halves 51*a, b, c* for about 50-80 seconds, a core 14 is lowered at a controlled speed into the gelling reacting mixture. At a later time a bottom mold half 59a, b, c of a series of bottom mold halves has similar mixture amounts introduced into its cavity 58.

Figure 3:
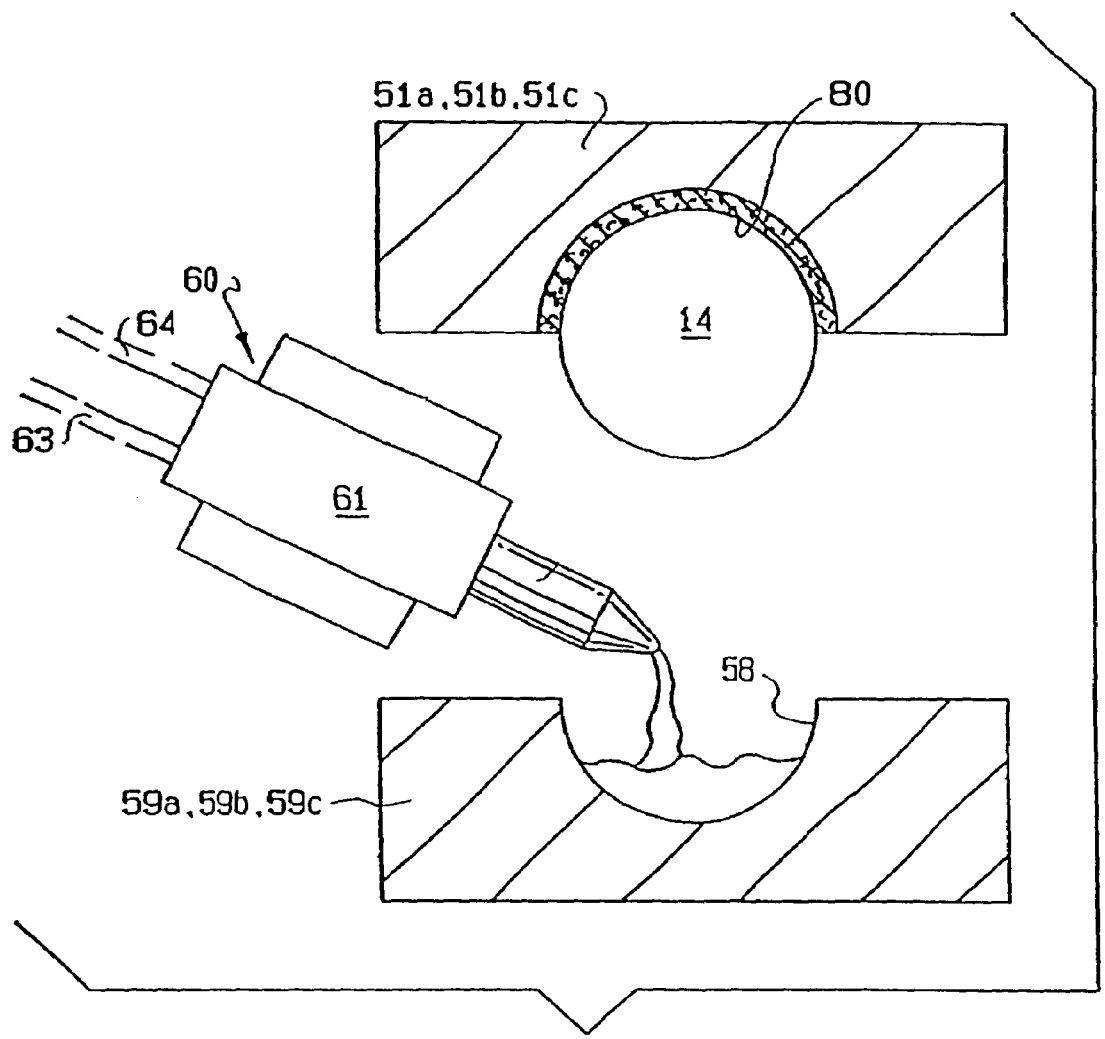
FIG. 3 shows an apparatus for mixing and dispensing polyurethane and shows one mold half being inverted before mating with second mold half.

Ball cup 46 holds ball core 14 through reduced pressure (or partial vacuum) in hose (not shown). Upon location of the coated core 14 in halves of the mold 51a, b, c after gelling for 50-80 seconds, the vacuum is released allowing core 14 to be released. Mold halves 51a, b, c with core 14 and solidified cover half 80 thereon is removed from the centering fixture unit, inverted (see FIG. 3) and mated with other mold halves 59a, b, c which, at an appropriate time earlier have had a selected quantity of reacting polyurethane prepolymer and curing agent introduced therein to commence gelling.

Similarly, U.S. Pat. No. 5,006,297 to Brown et al. and U.S. Pat. No. 5,334,673 to Wu both also disclose suitable coating techniques which may be utilized to apply the castable reactive liquids employed in the present invention. The disclosures of these patents are hereby incorporated by reference in their entirety. However, the method of the invention is not limited to the use of these techniques.

The following example of multilayer golf balls formed according to the present invention is given to illustrate the present invention. However, it is to be understood that the example is for illustrative purposes only and in no manner is the present invention limited to the specific disclosures therein.

EXAMPLE 1

Golf balls of the present invention can be manufactured as follows. The core may be made using either a conventional wound core construction or a conventional two-piece core construction formed using methods well known in the art. The wound core construction can be either a solid rubber-based center or a liquid filled center around which a length of elastic thread is wound. A conventional two-piece construction preferably comprises a cis 1,4 polybutadiene rubber that has been crosslinked with a metal salt of an unsaturated fatty acid such as zinc diacrylate.

These core constructions are then covered using a conventional compression molding technique with an inner cover layer of an ionomer having a methacrylic acid content of at least about 16 weight percent (preferably SURLYN 8140 or SURLYN 8546).

The outer cover layer can be formed following the processes set forth in U.S. Pat. No. 5,006,297 and U.S. Pat. No. 5,334,673. A particularly desired material for forming the outer cover layer is 40D castable urethane.

It is believed that golf balls made in accordance with the present invention will exhibit an appreciably lower spin rate when struck with a driver (and thus a greater overall distance) as compared to conventional "high performance" golf balls (e.g. Tour Balata [Titleist]), but have very similar or even higher spin rates when struck with an 8 iron and/or a "50 yard" wedge, thereby evidencing a "progressive performance" from driver to wedge in the golf balls of the present invention.

While it is apparent that the illustrative embodiments of the invention herein discloses fulfills the objective stated above, it will be appreciated that numerous modifications and other embodiments may be devised by those skilled in the art. Therefore, it will be understood that the appended claims are intended to cover all such modifications and embodiments which come within the spirit and scope of the present invention.

We claim:

1. A method of forming a golf ball comprising the steps of
   (a) forming a golf ball core;
   (b) forming an inner cover layer around said golf ball core with a material having a first shore D hardness, wherein forming the inner cover layer comprises molding the inner cover material; and
   (c) casting an outer cover layer of less than about 0.05 inches around said inner cover layer and golf ball core with a thermoset material having a second shore D hardness less than the first, wherein casting the outer cover layer comprises:
       (i) placing the golf ball core in core holder;
       (ii) gelling the thermoset material to a viscosity of between 2,000 cps to 30,000 cps in the first mold half;
       (iii) placing the golf ball core in to the gelling thermoset material in the first mold half;
       (iv) disengaging the golf ball core from the core holder after a selected period of time;
       (v) placing the golf ball core, while still in said first mold half with the thermoset material against a second mold half having additional thermoset material and mating the two mold halves together; and
       (vi) curing the thermoset material in the mated mold halves.

2. The method of claim 1, wherein the inner cover layer is formed of a material having a shore D hardness that is about 5 to about 50 greater than the shore D hardness of the thermoset material forming the outer cover layer.

3. The method of claim 1, wherein the inner cover layer is formed from at least one material selected from the group consisting of an ionomer resin, a polyurethane, a polyether-ester, a polyetheramide, a polyester, a dynamically vulcanized elastomer, a functionalized styrene-butadiene elastomer, a metallocene polymer, nylon, and acrylonitrilebutadiene-styrene copolymer.

4. The method of claim 1, wherein the outer cover layer thermoset material has a shore D hardness in the range of about 30 to about 60.

5. The method of claim 4, wherein the outer cover layer thermoset material has a shore D hardness in the range of about 35 to about 50.

6. The method of claim 5, wherein the outer cover layer thermoset material has a shore D hardness in the range of about 40 to about 45.

7. The method of claim 1, wherein the step of casting the thermoset material of the outer cover layer further comprises the step of a mixing a prepolymer and a curing agent in a motorized mixer.

8. The method of claim 7, wherein the step of casting the thermoset material of the outer cover layer further comprises heating first mold half during the casting process prior to gelling the thermoset material in the first mold half.

9. The method of claim 1, wherein the thermoset material of the outer cover layer comprises at least one of a thermoset urethane, a polyurethane, a thermoset urethane ionomer, or a thermoset urethane epoxy.

10. The method of claim 1, wherein the outer cover layer thickness is from about 0.02 to about 0.04 inches thick.

11. A method of forming a golf ball comprising the steps of
(a) forming a golf ball core;
(b) forming an inner cover layer around said golf ball core with a material having a first shore D hardness, wherein forming the inner cover layer comprises molding the inner cover material; and
(c) casting an outer cover layer of less than about 0.05 inches around said inner cover layer and golf ball core with a thermoset material having a second shore D hardness less than the first, wherein casting the outer cover layer comprises:
   (i) placing the golf ball core in core holder;
   (ii) gelling the thermoset material to a viscosity of between 2,000 cps to 30,000 cps in the first mold half;
   (iii) placing the golf ball core in to the gelling thermoset material in the first mold half;
   (iv) disengaging the golf ball core from the core holder after a selected period of time;
   (v) placing the golf ball core, while still in said first mold half with the thermoset material against a second mold half having additional thermoset material and mating the two mold halves together; and
   (vi) curing the thermoset material in the mated mold halves;
wherein the inner cover layer is formed of a material having a shore D hardness that about 5 to about 50 greater than the shore D hardness of the thermoset material forming the outer cover layer.

12. The method of claim 11, wherein the inner cover layer is formed from at least one material selected from the group consisting of an ionomer resin, a polyurethane, a polyetherester, a polyetheramide, a polyester, a dynamically vulcanized elastomer, a functionalized styrene-butadiene elastomer, a metallocene polymer, nylon, and acrylonitrilebutadiene-styrene copolymer.

13. The method of claim 11, wherein the outer cover layer thermoset material has a shore D hardness in the range of about 30 to about 60.

14. The method of claim 13, wherein the outer cover layer thermoset material has a shore D hardness in the range of about 35 to about 50.

15. The method of claim 14, wherein the outer cover layer thermoset material has a shore D hardness in the range of about 40 to about 45.

16. The method of claim 11, wherein the step of casting the thermoset material of the outer cover layer further comprises the step of a mixing a prepolymer and a curing agent in a motorized mixer.

17. The method of claim 16, wherein the step of casting the thermoset material of the outer cover layer further comprises heating first mold half during the casting process prior to gelling the thermoset material in the first mold half.

18. The method of claim 11, wherein the thermoset material of the outer cover layer comprises at least one of a thermoset urethane, a polyurethane, a thermoset urethane ionomer, or a thermoset urethane epoxy.

19. The method of claim 11, wherein the outer cover layer thickness is from about 0.02 to about 0.04 inches thick.

* * * * *